Feb. 7, 1950 P. J. THROCKMORTON 2,496,828
POULTRY FEEDER
Filed Oct. 25, 1945 2 Sheets-Sheet 1
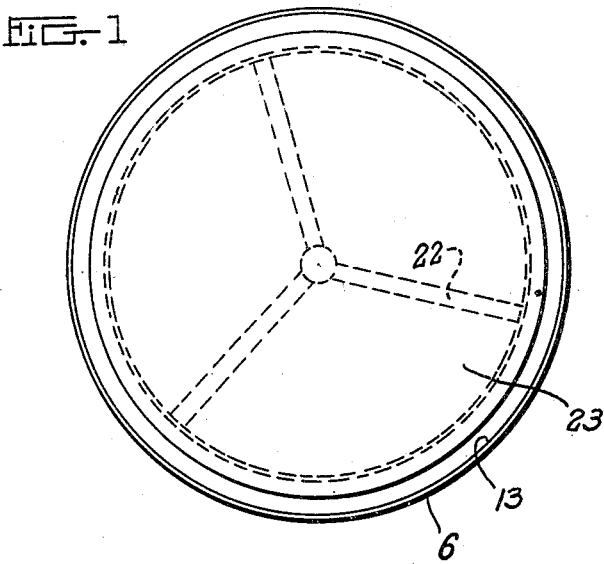
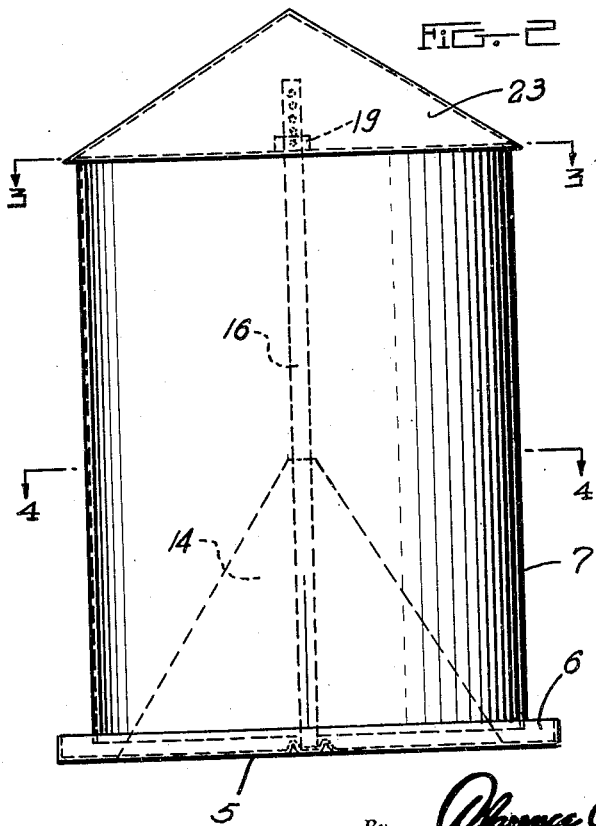
Inventor
Paul J. Throckmorton
By Clarence A. O'Brien
and Harvey B. Jacobson
Attorneys Feb. 7, 1950 P. J. THROCKMORTON 2,496,828
POULTRY FEEDER
Filed Oct. 25, 1945 2 Sheets-Sheet 2
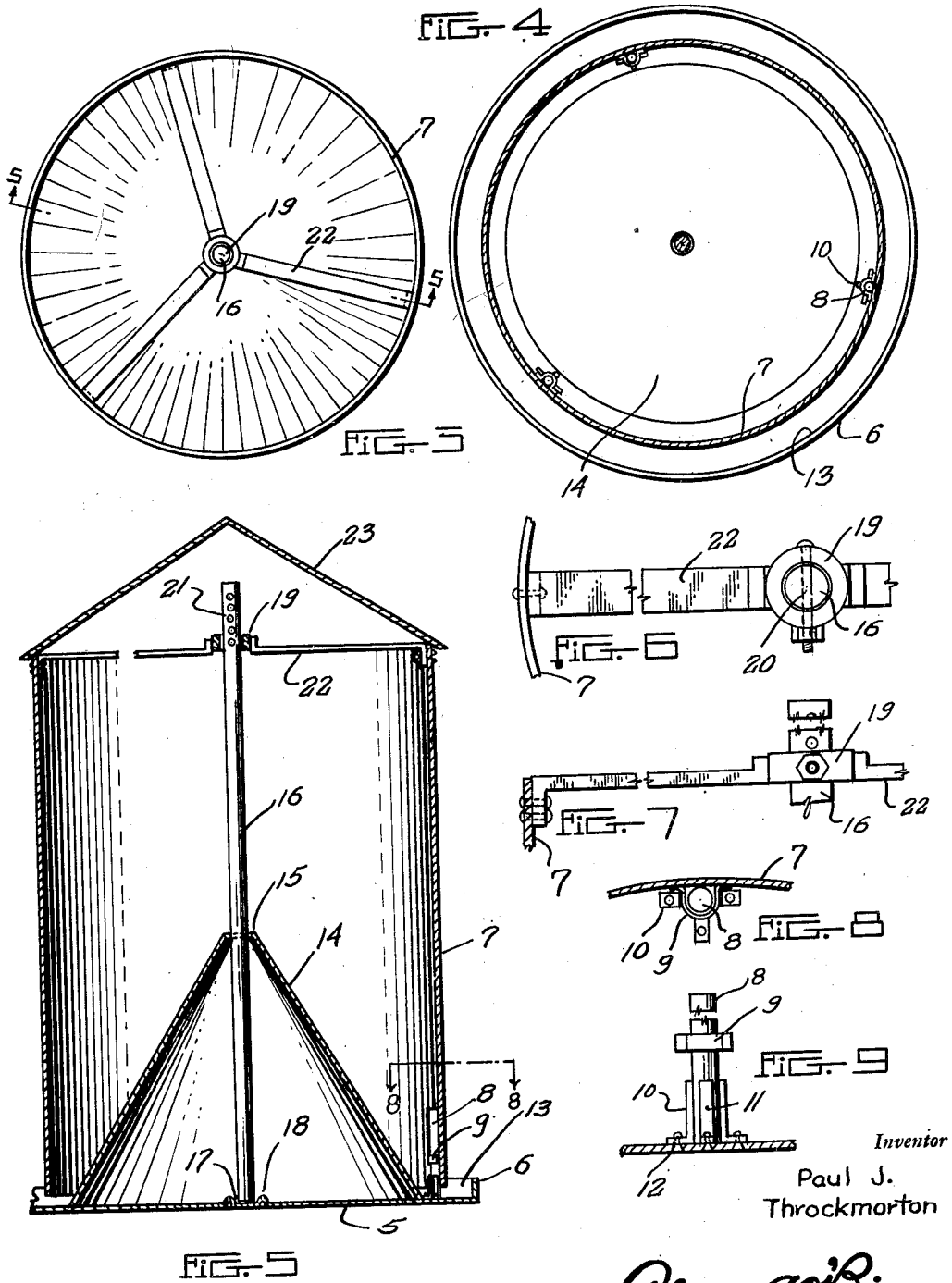
Inventor
Paul J. Throckmorton Patented Feb. 7, 1950

2,496,828

UNITED STATES PATENT OFFICE 2,496,828

POULTRY FEEDER

Paul J. Throckmorton, Memphis, Tex.

Application October 25, 1945, Serial No. 624,417

1 Claim. (Cl. 119—53)

The present invention relates to new and useful improvements in poultry feeders, and has for its primary object to provide a device of this character adapted for automatically and constantly feeding grain of various sizes to a feed pan or trough.

An important object of the present invention is to provide a feed hopper mounted for vertical adjustment above the feed pan or trough so as to control the volume of feed delivered to the pan.

A further object of the invention is to provide means for easily and quickly assembling the parts of the feeder and for separating the same for storage or cleaning purposes when desired.

Another object is to provide a device of this character of simple and practical construction, which is efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view.

Figures 3 and 4 are transverse sectional views taken respectively on lines 3—3 and 4—4 of Figure 2.

Figure 5 is a vertical sectional view taken substantially on a line 5—5 of Figure 3.

Figure 6 is an enlarged fragmentary top plan view of the guide for the vertically adjustable post for the hopper.

Figure 7 is a side elevational view thereof.

Figure 8 is a fragmentary sectional view taken substantially on a line 8—8 of Figure 5.

Figure 9 is a side elevational view thereof.

Referring now to the drawings in detail, wherein for the purpose of illustration I have disclosed a preferred embodiment of the invention, the numeral 5 designates the feed pan having an upstanding flange 6 at the edges thereof.

A cylindrical hopper 7 is supported in upright position by means of relatively short posts 8 slidably mounted in guides 9 secured to the inner side walls of the hopper adjacent the lower edges thereof, the lower ends of the posts being frictionally received and retained in sockets 10 formed of a plurality of circularly arranged L-shaped legs 11 secured to the pan 5 by rivets or the like 12.

The hopper 7 is spaced inwardly from the flange 6 of the pan to provide a feeding trough 13 between the lower edge of the hopper and the flange 6.

A cone 14 is supported on the pan 5 with the lower edges of the cone bearing against the bottom of the legs 11 to center the cone on the pan inwardly of the lower edge of the hopper 7 in a manner as more clearly illustrated in Figure 4 of the drawings and by means of which loose grain or other loose poultry feed when deposited in the hopper will be discharged under the lower edge thereof into the trough 13.

The top of the cone 14 is formed with an opening 15 for receiving a center post 16, the lower end of the center post being seated in a recess 17 formed in the upper surface of the pan 5 by pressing an annular rib 18 upwardly from the bottom of the pan.

A collar 19 is adjustable on the upper end of the post 16 and secured in vertically adjusted position by means of a bolt 20 inserted transversely of the collar and selectively inserted through vertically spaced openings 21 in the upper end of the post.

A plurality of horizontal rods 22 are secured to the collar 19 and extend radially therefrom to form a spider, the outer ends of the rods 22 being riveted or otherwise suitably secured to the upper end of the hopper 7. Accordingly, the hopper is adjusted vertically in accordance with the vertical adjustment of the collar 19 on the post 16 whereby to regulate the height of the lower end of the hopper above the pan 5 to control the volume of feed delivered into the trough 13.

A conical cover 23 is supported on the upper end of the hopper 7 for removal at will to permit filling of said hopper and to provide for access to the bolt 20, collar 19, and openings 21.

During the vertical adjustment of the hopper 7, the post 8 will remain fixed in the sockets 10 and will slide in the guides 9 to maintain the lower end of the hopper centered on the pan and in equally spaced relation at all sides from the flange 6.

In view of the foregoing description taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claim.

Having thus described the invention, what I claim is:

A poultry feeder comprising a feeding pan, a center post seated on said pan, a cylindrical hopper surrounding said post and having an open lower end disposed inwardly from the periphery of said feeding pan, means slidably suspending said hopper on said post for variably spacing the lower end thereof above said pan for controlled escape of feed through said space outwardly of the hopper into the pan, means for centering the lower end of the hopper relative to said pan comprising series of upstanding legs fixed in said pan and forming circularly arranged sockets within the confines of said hopper, and posts slidably fitted in the sockets and slidably associated with means secured to the inner surface of said hopper adjacent said lower end thereof, and a cone-shaped member in said hopper for deflecting feed outwardly through said space, said member having a larger end, smaller in diameter than said hopper, resting on said pan and surrounded by said sockets in edge engagement therewith, whereby said member is centered relative to said pan and hopper.

PAUL J. THROCKMORTON.

REFERENCES CITED

The following references are of record in the file of this patent:

UNITED STATES PATENTS

| Number | Name | Date |
|---|---|---|
| 905,393 | Webb | Dec. 1, 1908 |
| 1,223,199 | Patterson | Apr. 17, 1917 |
| 1,331,008 | Force | Feb. 17, 1920 |

FOREIGN PATENTS

| Number | Country | Date |
|---|---|---|
| 113,992 | Australia | Nov. 1, 1941 |